(12) United States Patent
Tinnakornsrisuphap et al.

(10) Patent No.: US 8,891,557 B2
(45) Date of Patent: Nov. 18, 2014

(54) METHOD AND APPARATUS FOR SENDING INFORMATION VIA SELECTION OF RESOURCES USED FOR TRANSMISSION

(75) Inventors: Peerapol Tinnakornsrisuphap, San Diego, CA (US); Qiang Wu, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 286 days.

(21) Appl. No.: 12/436,637

(22) Filed: May 6, 2009

(65) Prior Publication Data

US 2009/0290502 A1    Nov. 26, 2009

Related U.S. Application Data (60) Provisional application No. 61/055,117, filed on May 21, 2008.

(51) Int. Cl.
*H04B 3/10*      (2006.01)
*H04J 1/16*      (2006.01)
*H04B 7/216*     (2006.01)
*H04W 48/12*     (2009.01)

(52) U.S. Cl.
CPC ............................. *H04W 48/12* (2013.01)
USPC ........... 370/491; 370/206; 370/335; 370/342; 370/480; 375/298

(58) Field of Classification Search
USPC ........ 370/206, 328–339, 480, 491, 498, 500; 375/219–223, 295–352; 340/855.3, 340/855.4, 855.5, 870.01
See application file for complete search history.

(56) References Cited

U.S. PATENT DOCUMENTS 5,991,330 A * 11/1999 Dahlman et al. .............. 375/149
6,246,886 B1 * 6/2001 Oliva ........................ 455/426.1
(Continued)

FOREIGN PATENT DOCUMENTS

CN    1893314 A    1/2007
EP    1501205      1/2005
(Continued)

OTHER PUBLICATIONS

International Search Report and Written Opinion -PCT/US2009/044911, International Search Authority—European Patent Office—Feb. 3, 2010.
(Continued)

*Primary Examiner* — Benjamin H Elliott, IV
(74) *Attorney, Agent, or Firm* — Fariba Yadegar-Bandari (57) ABSTRACT

Techniques for transmitting information in a wireless network are described. In an aspect, information may be conveyed based on specific resources used to send a signal, e.g., a pilot. A pseudo-random function may receive the information to convey via the signal and possibly other information and may provide pseudo-random values, which may be used to select the resources to use to send the signal. In one design, a transmitter (e.g., a base station for a sector) may determine first information (e.g., a sector ID) to convey via a pilot and may also determine second information for absolute time (e.g. a pilot cycle index). The transmitter may determine resources (e.g., slots) to use to send the pilot based on the first and second information and possibly based further on a PN offset assigned to the sector. The transmitter may transmit the pilot in the determined resources.

21 Claims, 9 Drawing Sheets

(56) References Cited

U.S. PATENT DOCUMENTS

| | | | |
|---|---|---|---|
| 6,289,280 B1* | 9/2001 | Fernandez-Corbaton et al. | 701/214 |
| 6,999,794 B1* | 2/2006 | Lindskog et al. | 455/562.1 |
| 7,019,691 B1 | 3/2006 | Soltanian et al. | |
| 7,272,126 B2 | 9/2007 | Soltanian et al. | |
| 7,657,261 B2 | 2/2010 | Cooper et al. | |
| 7,693,550 B2* | 4/2010 | Lobinger et al. | 455/562.1 |
| 2001/0001609 A1 | 5/2001 | Mikuni et al. | |
| 2003/0008669 A1* | 1/2003 | Stein et al. | 455/456 |
| 2003/0222819 A1* | 12/2003 | Karr et al. | 342/457 |
| 2004/0258014 A1 | 12/2004 | Ro et al. | |
| 2005/0094550 A1 | 5/2005 | Huh et al. | |
| 2005/0163076 A1* | 7/2005 | Vannithamby et al. | 370/329 |
| 2005/0281290 A1* | 12/2005 | Khandekar et al. | 370/500 |
| 2006/0088134 A1* | 4/2006 | Gilhousen et al. | 375/345 |
| 2007/0153743 A1* | 7/2007 | Mukkavilli et al. | 370/332 |
| 2007/0270273 A1 | 11/2007 | Fukuta et al. | |
| 2008/0232240 A1* | 9/2008 | Baum et al. | 370/210 |
| 2008/0279220 A1* | 11/2008 | Wang | 370/500 |
| 2008/0298275 A1* | 12/2008 | De Sousa | 370/255 |
| 2009/0154447 A1* | 6/2009 | Humblet | 370/350 |
| 2009/0290502 A1* | 11/2009 | Tinnakornsrisuphap et al. | 370/252 |

FOREIGN PATENT DOCUMENTS

| | | |
|---|---|---|
| JP | 2000308124 A | 11/2000 |
| JP | 2005006287 A | 1/2005 |
| JP | 2008536404 A | 9/2008 |
| WO | WO-2006110570 A1 | 10/2006 |
| WO | WO2007024932 | 3/2007 |
| WO | WO2007127902 A2 | 11/2007 |
| WO | WO2007137276 | 11/2007 |
| WO | WO 2007146952 A2 * | 12/2007 |
| WO | WO2008052026 | 5/2008 |
| WO | WO2008057898 | 5/2008 |

OTHER PUBLICATIONS

Qiang Wu et al: "cdma2000 Highly Detectable Pilot" Communications Workshops, 2008. ICC Workshops '08. IEEE International Conference ON, IEEE, Piscataway, NJ, USA, May 19, 2008, pp. 16-20, XP031265196 ISBN: 978-1-4244-2052-0 p. 1, left-hand column, line 8—p. 1, right-hand column, line 31.

Taiwan Search Report—TW098116879—TIPO—Dec. 1, 2013.

* cited by examiner

METHOD AND APPARATUS FOR SENDING INFORMATION VIA SELECTION OF RESOURCES USED FOR TRANSMISSION

The present application claims priority to provisional U.S. Application Ser. No. 61/055,117, entitled "SYSTEM AND METHOD TO DETERMINE THE IDENTITY OF A SECTOR FROM A HIGHLY DETECTABLE PILOT RANDOM TRANSIT PATTERN," filed May 21, 2008, assigned to the assignee hereof and incorporated herein by reference.

BACKGROUND

I. Field

The present disclosure relates generally to communication, and more specifically to techniques for sending and receiving information in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of terminals. Each base station may transmit a pilot to allow terminals to detect the base station. Each base station may also send information to allow terminals to identify the base station. It may be desirable to send the pilot and information in an efficient manner.

SUMMARY

Techniques for transmitting information in a wireless communication network are described herein. In an aspect, information may be conveyed based on specific resources used to send a signal, e.g., a pilot. A pseudo-random function may be used to determine which resources to use to send the signal. The pseudo-random function may receive the information to convey via the signal and possibly other information and may provide pseudo-random values, which may be used to select the resources to use to send the signal.

In one design, a transmitter (e.g., a base station) may determine first information to convey via a pilot and may also determine second information for absolute time. In one design, the pilot may be a highly detectable pilot (HDP) having wider coverage than a common pilot. The first information may comprise a sector identity (ID) of a sector transmitting the pilot. The pilot may be transmitted in each pilot cycle, and the second information may comprise a pilot cycle index. The transmitter may determine resources (e.g., slots) to use to send the pilot based on the first and second information. The resources may also be determined based further on a pseudo-random number (PN) offset, a pilot scrambling code, a physical cell ID (PCI), or some other parameter assigned to the sector. The transmitter may transmit the pilot in the determined resources.

In one design, a receiver (e.g., a terminal) may detect for transmissions of the pilot in resources (e.g., slots) available for sending the pilot. The receiver may identify resources in which transmissions of the pilot are detected. The receiver may recover the first information conveyed via the pilot based on second information for absolute time (e.g., pilot cycle index) and third information for the resources in which the transmissions of the pilot are detected (e.g., slot indices).

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as cdma2000, Universal Terrestrial Radio Access (UTRA), etc. cdma2000 covers IS-2000, IS-95 and IS-856 standards. IS-2000 Releases 0 and A are commonly referred to as CDMA2000 1X, 1X, etc. IS-856 is commonly referred to as CDMA2000 1xEV-DO, High Rate Packet Data (HRPD), etc. UTRA includes Wideband CDMA (WCDMA) and other variants of CDMA. A TDMA network may implement a radio technology such as Global System for Mobile Communications (GSM). An OFDMA network may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for HRPD, and HRPD terminology is used in much of the description below.

Figure 1:
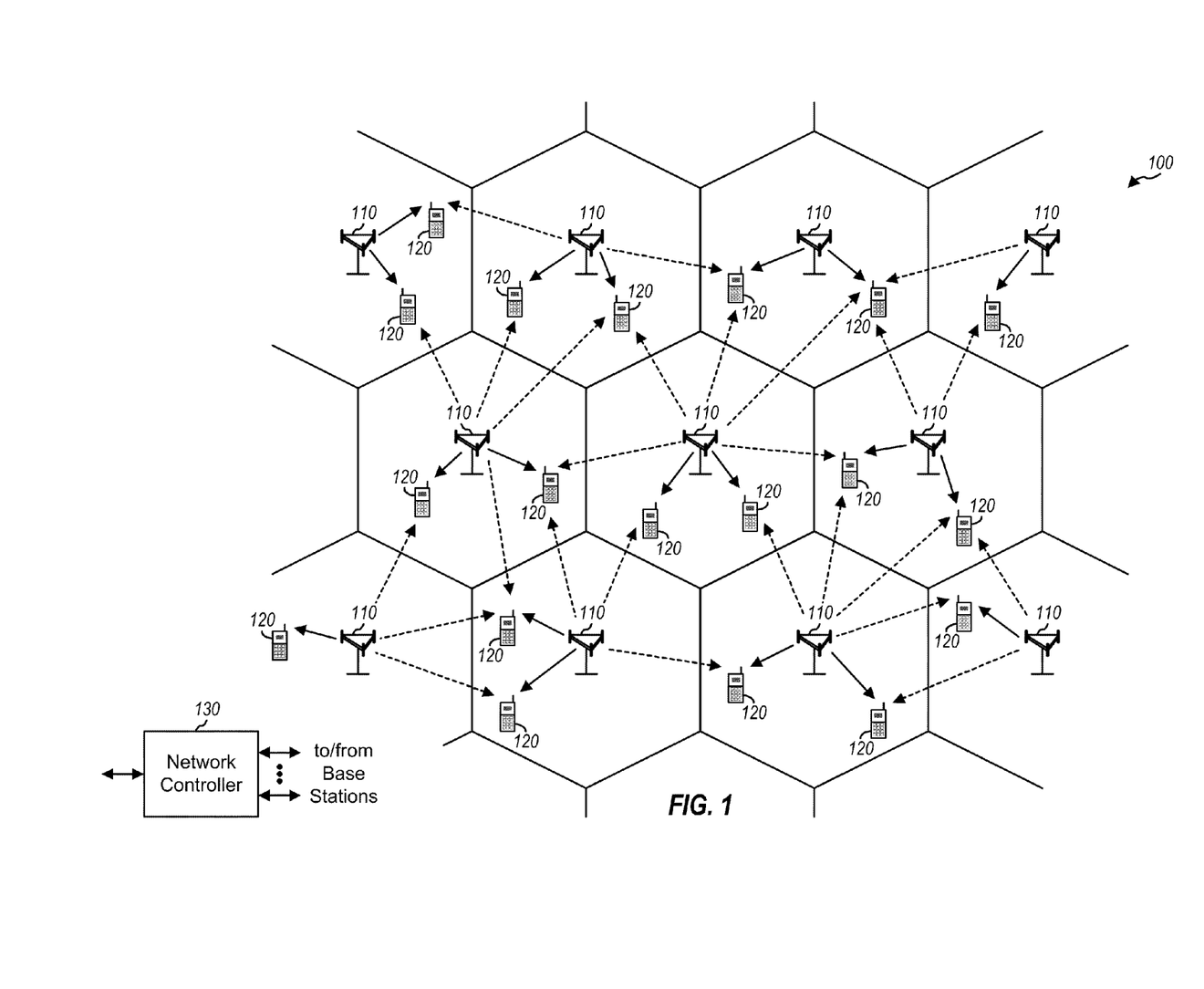
FIG. 1 shows a wireless communication network.

FIG. 1 shows a wireless communication network 100 with multiple base stations 110. A base station may be a station that communicates with the terminals and may also be referred to as an access point, a Node B, an evolved Node B (eNB), etc. Each base station 110 may provide communication coverage for a particular geographic area. In 3GPP, the term "cell" can refer to a coverage area of a base station and/or a base station subsystem serving this coverage area, depending on the context in which the term is used. In 3GPP2, the term "sector" or "cell-sector" can refer to a coverage area of a base station and/or a base station subsystem serving this coverage area. For clarity, 3GPP2 concept of "sector" is used in the description below. A base station may support one or multiple (e.g., three) sectors.

Wireless network 100 may be a homogeneous network that includes base stations of one type, e.g., only macro base stations. Wireless network 100 may also be a heterogeneous network that includes base stations of different types, e.g., macro, pico, and/or femto base stations. A macro base station may cover a relatively large geographic area (e.g., several kilometers in radius) and may allow unrestricted access by terminals with service subscription. A pico base station may cover a relatively small geographic area and may allow unrestricted access by terminals with service subscription. A femto or home base station may cover a relatively small geographic area (e.g., a home) and may allow restricted access by terminals having association with the femto cell (e.g., terminals for users in the home). Wireless network 100 may also include relay stations. The techniques described herein may be used for both homogeneous and heterogeneous networks. A network controller 130 may couple to a set of base stations and provide coordination and control for the base stations.

Terminals 120 may be dispersed throughout wireless network 100, and each terminal may be stationary or mobile. A terminal may also be referred to as a mobile station, a user equipment (UE), a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may communicate with a base station via the forward and reverse links. The forward link (or downlink) refers to the communication link from the base station to the terminal, and the reverse link (or uplink) refers to the communication link from the terminal to the base station. In FIG. 1, a solid line with a single arrow indicates a terminal receiving a data transmission from a serving sector, and a dashed line with a single arrow indicates a terminal receiving pilot from a sector. Reverse link transmissions are not shown in FIG. 1. A terminal may also operate as a base station, e.g., as a pico or femto base station. A terminal may also be collocated with or integrated in a base station.

Each sector in wireless network 110 may transmit a common pilot, which may be used by terminals for sector detection, time synchronization, channel estimation, etc. A pilot is a signal or transmission that is known a priori by a transmitter and a receiver. A pilot may also be referred to as a reference signal, a preamble, etc. A common pilot is a pilot sent to all terminals. Each sector may also transmit a highly detectable pilot (HDP), which may have wider coverage and better hearability than the common pilot. A terminal may be able to detect sectors farther away based on the HDPs transmitted by these sectors.

Each sector may spectrally spread its transmissions with a PN sequence. All sectors in the wireless network may use the same PN sequence for spreading. However, neighboring sectors may be assigned different offsets of the PN sequence to allow terminals to distinguish these sectors. For example, in HRPD, each sector may be assigned one of 512 possible PN offsets, and the assigned PN offset may be given by a 9-bit value and may be referred to as a PilotPN, a seedPN, a sector PN, etc. Since the wireless network may include more than 512 sectors, a sector may not be uniquely identified by its PilotPN. In other wireless networks, each sector or cell may be assigned a pilot scrambling code, a physical cell ID, or some other parameter. For clarity, the following description assumes that each sector is assigned a specific PilotPN.

Each sector may also be assigned a unique sector ID (SectorID) in addition to a specific PilotPN. For example, in HRPD, each sector may be assigned a 32-bit SectorID that can uniquely identify the sector. For a femto sector, the SectorID may be a 32-bit IPv4 address assigned to the sector. A sector may generate its HDP based on its PN sequence. It may also be desirable to convey the SectorID in the HDP to allow terminals to detect and identify the sector.

In an aspect, information (e.g., a sector ID) may be conveyed based on specific resources (e.g., slots) used to send a signal (e.g., an HDP). A pseudo-random function may be used to determine which resources to use to send the signal. The pseudo-random function may (i) receive the information to convey via the signal and possibly other information and (ii) provide pseudo-random values, which may be used to select the resources to use to send the signal.

Figure 2:
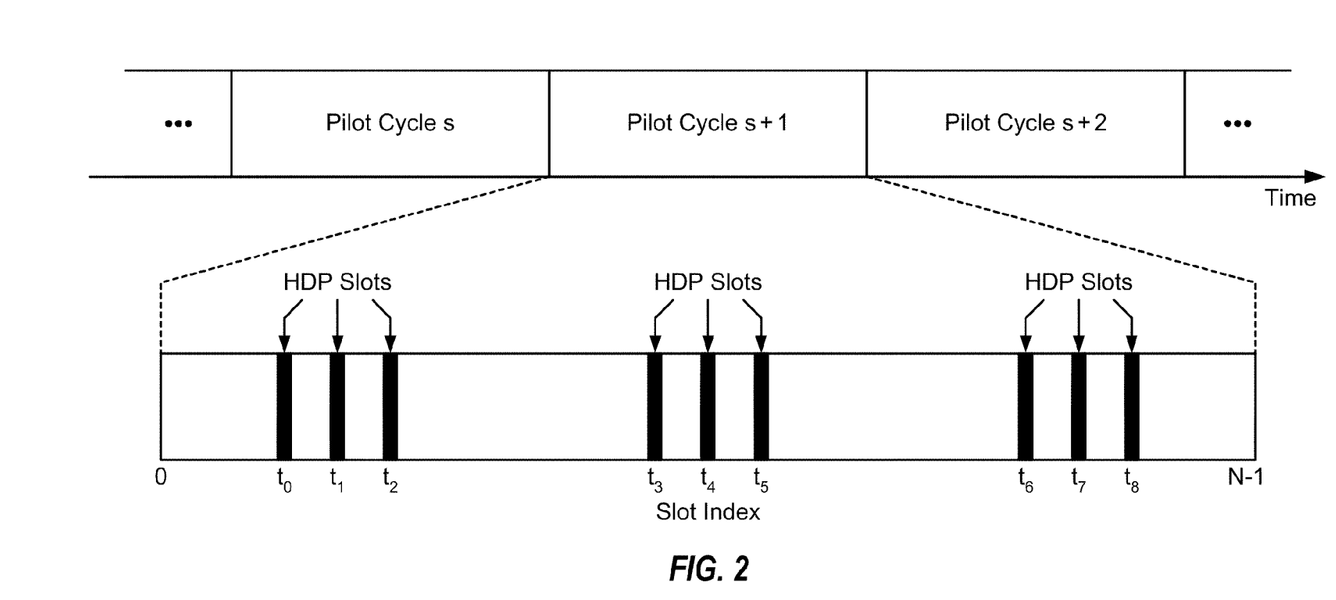
FIG. 2 shows a transmission structure for HDP.

FIG. 2 shows a design of a transmission structure for HDP in HRPD. The transmission timeline for the forward link may be partitioned into units of slots, with each slot having a duration of 1.667 milliseconds (ms). A slot may also be referred to as a time slot, a subframe, a frame, etc. The transmission timeline may also be partitioned into pilot cycles with sequentially increasing indices. Each pilot cycle may cover N slots with indices 0 through N−1, where N may be equal to 768, 2304, or some other value. In each pilot cycle, nine slots with indices $t_0, t_1, \ldots, t_8$ may be available for sending HDP and may be referred to as HDP slots. The nine HDP slots $t_0$ to $t_8$ may be dependent on the value of N and are known by the base stations and the terminals.

A sector may send its HDP in one HDP slot in each pilot cycle. In one design, the sector may select one HDP slot in each pilot cycle based on a pseudo-random function, as follows:

$$x = f(PilotPN, SectorID, Time), \quad \text{Eq (1)}$$

where Time denotes absolute time,
$f(\ )$ denotes the pseudo-random function, and
$x \in \{0, \ldots, 8\}$ is a random integer that determines the selected HDP slot.

The random integer x may have pseudo-random properties and may be generated based on the pseudo-random function.

In one design, Time may be given by a pilot cycle index s. Equation (1) may then be expressed as:

$$x(s) = f(PilotPN, SectorID, Pilot\ Cycle\ Index\ s), \quad \text{Eq (2)}$$

where x(s) is a random integer that determines the selected HDP slot in pilot cycle s. The sequence of HDP slots used to transmit the HDP may be referred to as a random transmit pattern for the HDP.

The nine possible values of x(s) may be mapped to the nine available HDP slots in each pilot cycle based on a one-to-one mapping. The sector may transmit its HDP in slot $t_0$ if x=0, in slot $t_1$ if x=1, etc.

In general, the pseudo-random function may receive any set of parameters for any information to convey in the HDP. Furthermore, the pseudo-random function may receive any number of bits for each parameter. In one design, the pseudo-random function may receive the following parameters:
9 bits for PilotPN
8 least significant bits (LSBs) of the SectorID, and
15 LSBs of the pilot cycle index.
The pseudo-random function may also receive fewer or more bits for each parameter. For example, the pseudo-random function may receive 9 bits for PilotPN, 7 LSBs of the SectorID, and 16 LSBs of the pilot cycle index. For a given total number of input bits into the pseudo-random function, more bits may be sent for the SectorID by reducing the number of bits for the pilot cycle index. For example, up to 10 bits may be sent for the SectorID by reducing the number of bits for the pilot cycle index down to 13. However, since the number of bits for time determines the periodicity of the pseudo-random function, it may be desirable to not reduce the number of bits for time too much.

The pseudo-random function may be implemented in various manners. In one design, a random integer x(s) for time duration T, where $N \cdot s \leq T < N \cdot (s+1)$, may be determined as follows:

1. Set seedPN to the 9-bit PilotPN of the sector,
2. Set seedLSB to the 8 LSBs of the SectorID of the sector,
3. Compute a 32-bit seed m=[9-bit seedPN, 8-bit seedLSB, 15-bit LSB of s],
4. Map the 32-bit seed m to a 32-bit $n=(2654435716 \times m^2) \bmod 2^{32}$, and
5. Compute $x(s) = \lfloor n/536870000 \rfloor$, where "$\lfloor \ \rfloor$" denotes a floor operator.

The pseudo-random function may also be implemented in other manners.

Figure 3:
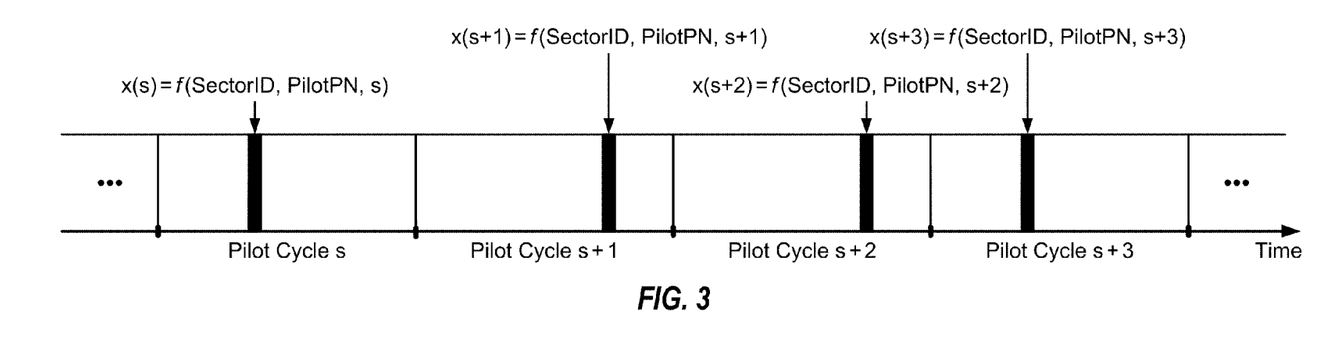
FIG. 3 shows transmission of HDP by one sector.

FIG. 3 shows a design of transmission of the HDP by one sector. The pseudo-random function may receive the PilotPN and the SectorID of the sector as well as the pilot cycle index for time, as shown in equation (2). In pilot cycle s, the pseudo-random function may output a value x(s), and the sector may transmit the HDP in slot $t_{x(s)}$. In the next pilot cycle s+1, the pseudo-random function may output a value x(s+1), and the sector may transmit the HDP in slot $t_{x(s+1)}$. In the following pilot cycle s+2, the pseudo-random function may output a value x(s+2), and the sector may transmit the HDP in slot $t_{x(s+2)}$. The sector may transmit the HDP in similar manner in each subsequent pilot cycle.

Sending more information and/or more information bits in the HDP may greatly extend the amount of time (and also the amount of processing) needed by a terminal to recover the information from the HDP. In one design, a sector may send more information in the HDP by partitioning the information into multiple parts. The sector may then send each part of the information via a separate instance of the HDP.

Figure 4:
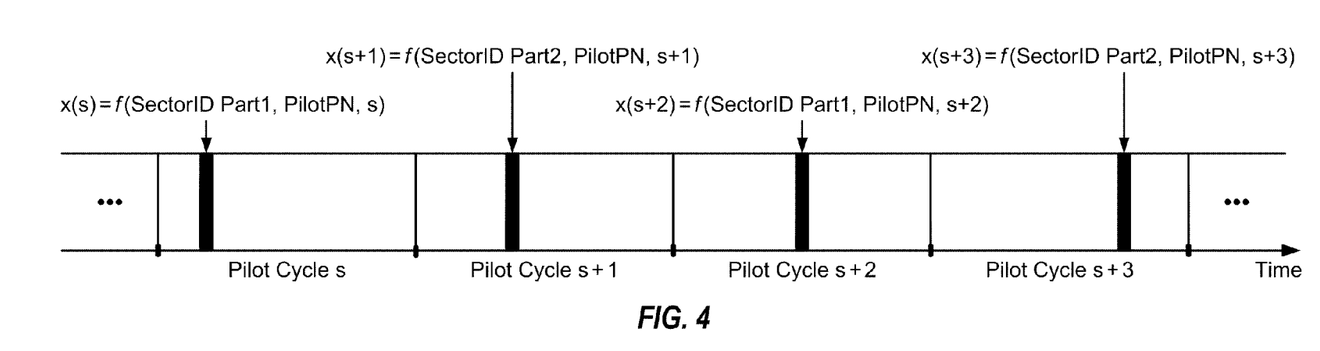
FIG. 4 shows transmission of multiple instances of HDP by one sector.

FIG. 4 shows a design of transmission of multiple instances of the HDP by one sector. In this design, the SectorID may be partitioned into two parts. The first part may include the 8 LSBs of the SectorID, and the second part may include the 9th through 16th LSBs of the SectorID. The first part of the SectorID may be sent in a first instance of the HDP in pilot cycles with even indices. The second part of the SectorID may be sent in a second instance of the HDP in pilot cycles with odd indices. In each pilot cycle with an even index, the pseudo-random function may receive the first part of the SectorID, the PilotPN, and the pilot cycle index and may output a random integer that determines the selected HDP slot for that pilot cycle. In each pilot cycle with an odd index, the pseudo-random function may receive the second part of the SectorID, the PilotPN, and the pilot cycle index and may output a random integer that determines the selected HDP slot for that pilot cycle.

The first HDP instance may be sent in pilot cycles with even indices and may carry the first part of the SectorID. The second HDP instance may be sent in pilot cycles with odd indices and may carry the second part of the SectorID. For each HDP instance, the pseudo-random function may receive only the part of the SectorID to convey via that HDP instance. Since the two HDP instances are sent in alternating pilot cycles, the overhead for the HDP in FIG. 4 is the same as the overhead for the HDP in FIG. 3.

A terminal may recover the first part of the SectorID from the first HDP instance sent in pilot cycles with even indices. The terminal may recover the second part of the SectorID from the second HDP instance sent in pilot cycles with odd indices. The terminal may thus independently recover the first and second parts of the SectorID from the two HDP instances sent by the sector.

Partitioning the SectorID into two parts and sending each part in a separate HDP instance may greatly reduce both detection time and receiver processing at the terminal. For example, the terminal may be able to detect one 8-bit part of the SectorID in about five pilot cycles and may be able to recover both 8-bit parts of the SectorID in about ten pilot cycles. If all 16 LSBs of the SectorID are sent in one HDP instance, then the terminal may be able to recover the 16 LSBs in about 41 pilot cycles. Detection time may thus be reduced by a factor of about four by partitioning the SectorID into two parts.

FIG. 4 shows a design in which two parts of the SectorID are conveyed via two HDP instances. The SectorID may also be partitioned into more than two parts. For example, the 32 bits of the SectorID may be partitioned into four parts, with each part including 8 bits of the SectorID. The four parts of the SectorID may be conveyed via four HDP instances. Each HDP instance may be sent in a respective set of pilot cycles. The total number of bits to send for the SectorID may be dependent on the total number of sectors to be uniquely identified by the HDP. The total number of sectors may, in turn, be dependent on the size of the wireless network, whether the wireless network includes pico and femto base stations as well as macro base stations, etc.

In general, information (e.g., a SectorID) to convey via the HDP may be partitioned into K parts, where K may be any integer value. The K parts may include the same or different numbers of information bits. The K parts may be sent via K HDP instances, one part in each HDP instance. In one design, the K HDP instances may be sent at the same rate. In this design, HDP instance k, for $k \in \{0, \ldots, K-1\}$, may be sent in pilot cycles with indices (s mod K)=k. In another design, different HDP instances may be sent at different rates. For example, the 8 LSBs of the SectorID may be sent more frequently (e.g., two or more times more often than the remaining bits of the SectorID) to allow the terminals to detect the 8 LSBs of the SectorID more quickly.

Figure 5:
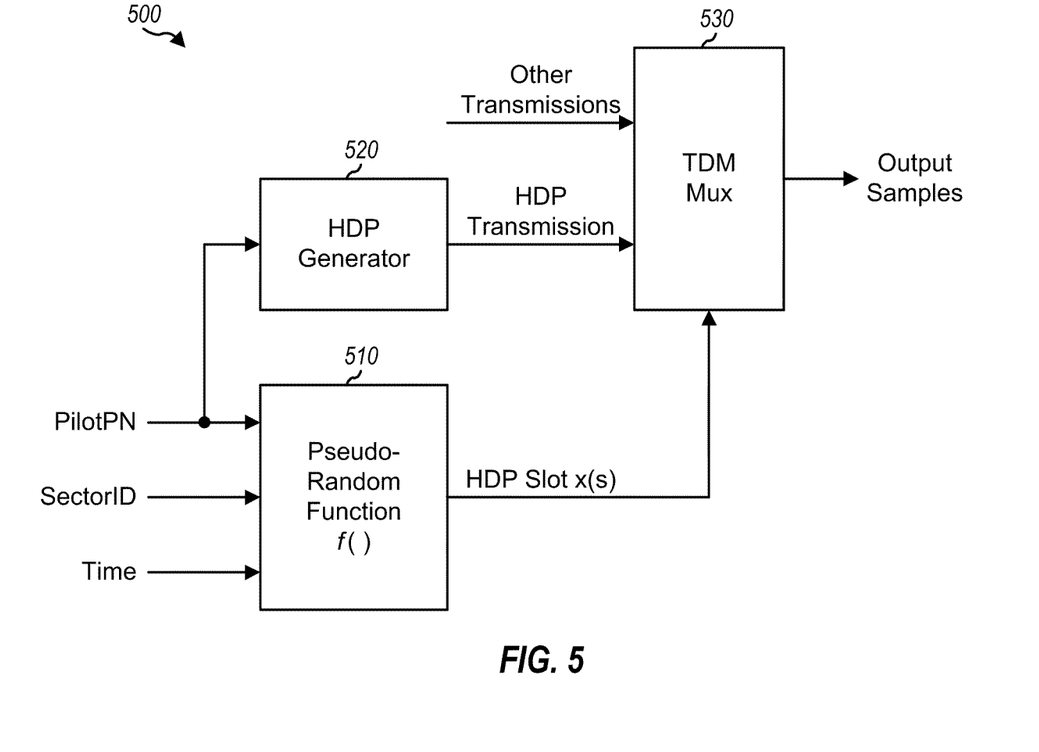
FIG. 5 shows a block diagram of a portion of a transmitter for one sector.

FIG. 5 shows a block diagram of a design of a portion of a transmitter 500 for a sector. Within transmitter 500, a unit 510 may receive the PilotPN and the SectorID for the sector and the pilot cycle index for time. Unit 510 may apply the three inputs to the pseudo-random function and provide a random integer x(s), which may determine the selected HDP slot in each pilot cycle.

An HDP generator 520 may receive the PilotPN and may generate an HDP transmission, which may be sent in one HDP slot. For HRPD, the HDP transmission may be generated by covering a predefined symbol sequence (e.g., all zeros) with a Walsh cover, scaling the resultant bits, and spreading the scaled bits with a PN sequence at an offset defined by the PilotPN. The HDP transmission may thus carry only the PilotPN.

A time division multiplex (TDM) multiplexer (Mux) 530 may receive the HDP transmission at a first input and other transmissions at a second input. The other transmissions may include the common pilot, control information, data, etc. Multiplexer 530 may provide the HDP transmission in each selected HDP slot for the sector and may provide the other transmissions in non-HDP slots. Multiplexer 530 may also provide the common pilot and control information (but no HDP or data) in each non-selected HDP slot.

A terminal may detect for HDP transmissions from sectors in each HDP slot of each pilot cycle. The terminal may detect zero, one, or multiple HDP transmissions in a given HDP slot. For each detected HDP transmission, the terminal can ascertain the HDP slot in which the HDP transmission is detected as well as the PilotPN used to generate the HDP transmission. The terminal may have accurate absolute time (e.g., from GPS) or rough absolute time (e.g., to within 100 ms by performing Network Time Protocol (NTP) via the Internet). After detecting an HDP transmission, the terminal may be able to obtain accurate absolute time based on a combination of HDP timing information and NTP. In any case, the terminal may be able to ascertain the pilot cycle index for each detected HDP transmission based on its knowledge of absolute time and the transmission structure for HDP. The terminal may use all of the available information to recover the SectorID.

For the pseudo-random function shown in equation (1) or (2), the terminal may have knowledge of two inputs (i.e., the PilotPN and the pilot cycle index) as well as the output (i.e., the random integer x(s)) for each detected HDP transmission. Since the pseudo-random function is a many-to-one function, a single observation of x(s) will not uniquely determine the SectorID. Furthermore, the pseudo-random function may be a highly non-linear function, and the inverse operation may be much more computational intensive than simply executing the function.

The terminal may attempt to recover the SectorID from the detected HDP transmissions based on various search algorithms. In a first search algorithm, the terminal may maintain a list of SectorID candidates for each detected PilotPN. The SectorID candidates may correspond to SectorIDs of candidate sectors that might transmit the HDP. The terminal may reduce this candidate list whenever an HDP transmission with that PilotPN is detected.

Figure 6:
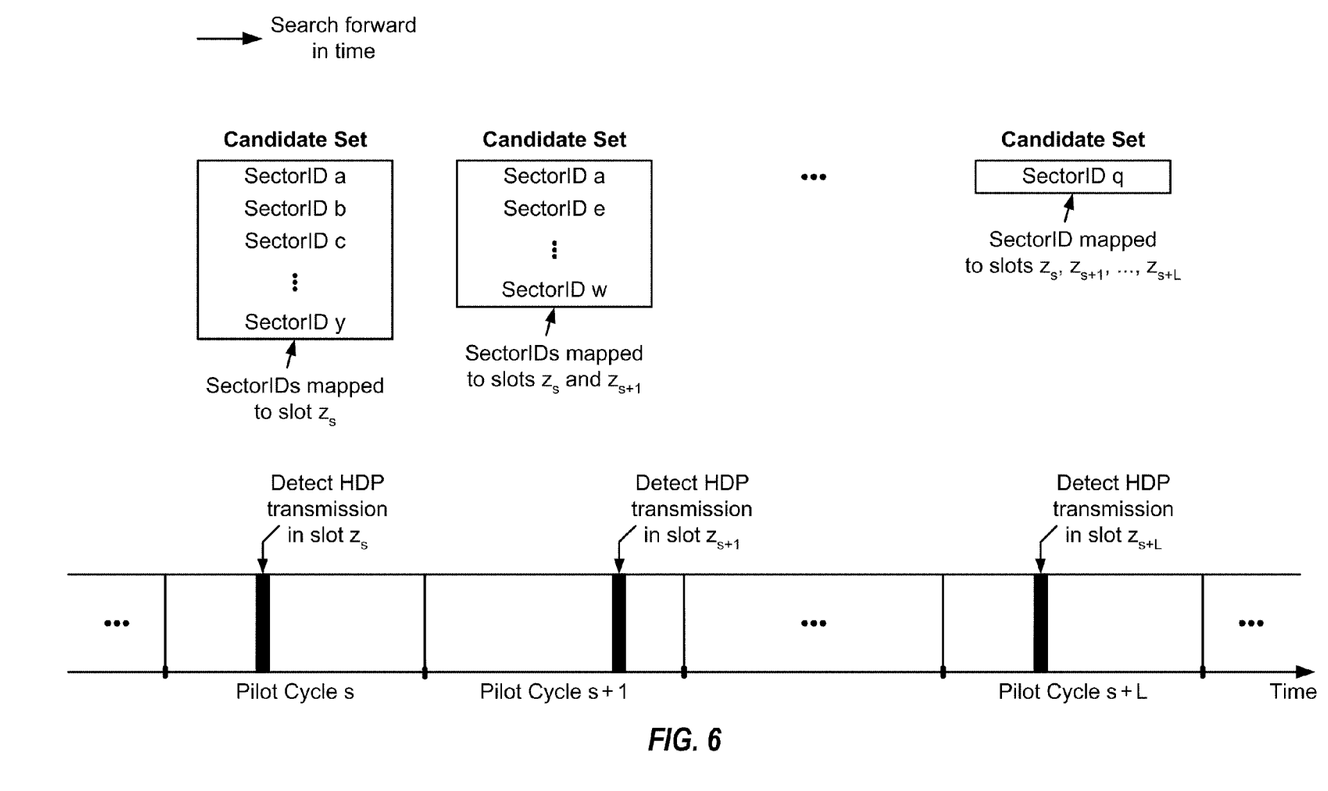
FIGS. 6 and 7 illustrate HDP detection with two search algorithms.

FIG. 6 illustrates SectorID detection based on the first search algorithm. The terminal may detect an HDP transmission with a particular PilotPN in HDP slot $z_s$ in pilot cycle s, where $z_s \in \{t_0, \ldots, t_8\}$. The terminal may then evaluate each possible SectorID to determine whether or not to include that SectorID in the candidate list. For example, the terminal may evaluate each of 256 possible LSBs of SectorIDs for the case in which 8 LSBs of the SectorID are conveyed via the HDP.

For each possible SectorID i, the terminal may execute the pseudo-random function with the detected PilotPN, pilot cycle s, and SectorID i as inputs. The terminal may then compare the random integer x(s) from the pseudo-random function against the detected HDP slot $z_s$. The terminal may place SectorID i in the candidate list if $x(s)=z_s$ and may discard SectorID i otherwise. In the next pilot cycle s+1, the terminal may detect an HDP transmission with the same PilotPN in HDP slot $z_{s+1}$. For each SectorID i in the candidate list, the terminal may execute the pseudo-random function with the detected PilotPN, pilot cycle s+1, and SectorID i as inputs. The terminal may then compare the random integer x(s+1) from the pseudo-random function against the detected HDP slot $z_{s+1}$. The terminal may retain SectorID i in the candidate list if $x(s+1)=z_{s+1}$ and may remove SectorID i otherwise. The terminal may repeat the processing for each subsequent detected HDP transmission with the same PilotPN. When the candidate list reduces to one SectorID, this SectorID may be provided as the SectorID of a sector detected by the terminal.

Each HDP slot $z_s$ with a detected HDP transmission may be referred to as an observation of the pseudo-random function output x(s). For each observation $z_s$, the candidate list may be pruned to remove SectorID candidates not matching $z_s$. A SectorID of a sector transmitting the HDP may be identified with a sufficient number of observations.

The terminal may encounter two types of detection errors:
Missed detection—an HDP transmission is not detected by the terminal, and
False alarm—an HDP transmission is detected in a wrong HDP slot.

For the first search algorithm described above, a missed detection may have a small impact on detection performance since the terminal may simply maintain the candidate list (without pruning any SectorID candidates) whenever a missed detection occurs. However, a false alarm may result in removal of the correct SectorID from the candidate list. This error event may be detected when the candidate list reduces to zero after a sufficient number of observations. The search may then be restarted with all possible SectorID candidates.

In a second search algorithm, the terminal may maintain a list of HDP slots in which HDP transmissions with a particular PilotPN have been detected, i.e., a list of observations for the particular PilotPN. The terminal may update the list of observations whenever a new observation is obtained for the PilotPN. The terminal may then evaluate all possible SectorID candidates against the list of observations, working backward in time.

Figure 7:
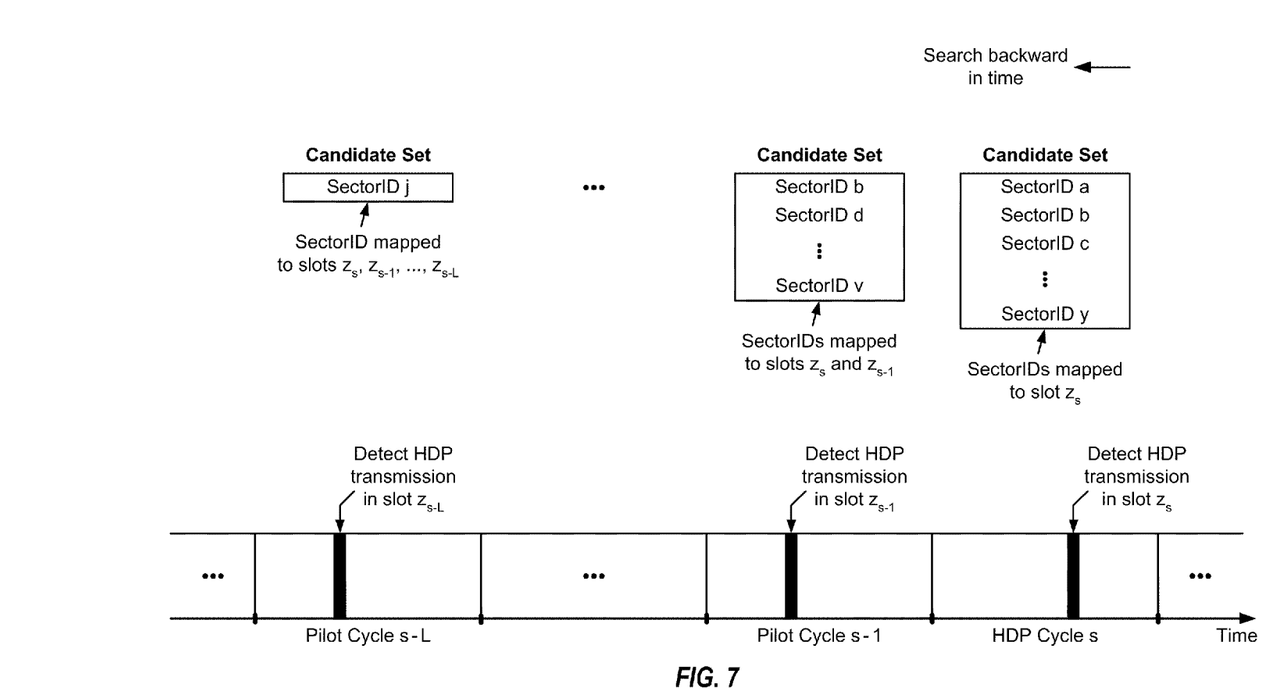

FIG. 7 illustrates SectorID detection based on the second search algorithm. The terminal may detect an HDP transmission with a particular PilotPN in HDP slot $z_s$ in pilot cycle s and may add this new observation to the list of observations for this PilotPN. For each possible SectorID i, the terminal may execute the pseudo-random function with the detected PilotPN, pilot cycle s, and SectorID i as inputs. The terminal may compare x(s) from the pseudo-random function against observation $z_s$, place SectorID i in the candidate list if $x(s)=z_s$, and discard SectorID i otherwise. If the candidate list includes multiple SectorID candidates, then the terminal may evaluate the candidate list against observation $z_{s-1}$ in the prior pilot cycle s−1. For each SectorID i in the candidate list, the terminal may execute the pseudo-random function with the detected PilotPN, pilot cycle s−1, and SectorID i as inputs. The terminal may compare x(s−1) from the pseudo-random function against observation $z_{s-1}$, retain SectorID i in the candidate list if $x(s-1)=z_{s-1}$, and remove SectorID i otherwise. The terminal may repeat the processing until the candidate list includes either zero or one SectorID. If the candidate list includes one SectorID, then this SectorID may be provided as the SectorID of a sector detected by the terminal. If the candidate list is empty, then a false alarm may have occurred for one or more of the observations.

The second search algorithm may allow the terminal to more quickly detect and identify a sector in the presence of false alarm. By working backward in time, the second search algorithm essentially allows the terminal to start the search with the first valid observation after a false alarm, which may reduce detection time. Therefore, the terminal can detect the correct SectorID as soon as there are enough consecutive observations to uniquely determine the SectorID.

The terminal may also detect for sectors in other manners. For example, the terminal may pseudo-randomly select observation $z_s$ from the list of observations, and not in any consecutive orders. In general, observations for detected HDP transmissions with a given PilotPN may be used to narrow the list of SectorID candidates, e.g., using one of the algorithms described above or some other algorithm.

Sending the SectorID in the HDP may be beneficial for various purposes. First, a given sector or terminal may be able to detect and identify neighbor sectors of different types, e.g., macro, pico, and femto sectors. The sector or terminal may be able to detect the PilotPN, the SectorID, and timing information from the HDP of each neighbor sector with much better hearability than the common pilot. The sector may use the SectorIDs of the detected sectors to initiate neighbor discovery between femto-femto, femto-macro, macro-macro, etc. Second, the sector may be able to perform automatic configuration based on information obtained from the HDPs of detected sectors. The sector may automatically configure its PilotPN, its SectorID, and/or other parameters after neighbor discovery. The sector (which may be a femto sector) may need to determine is location as well as the identity of neighbor sectors as part of automatic configuration. The sector may obtain and report the SectorIDs of the detected neighbor sectors to a network entity, e.g., network controller 130 in FIG. 1. The network entity may be able to determine a location estimate for the sector based on the reported SectorIDs and the known locations of the neighbor sectors. The location estimate of the sector may be used to control operation of the sector, e.g., to determine the frequency on which the sector can operate. The location estimate of the sector may also be used to facilitate positioning of terminals communicating with the sector. Location estimates obtained based on the HDPs of the neighbor sectors may be especially beneficial for (i) femto base stations deployed indoors where GPS signals may be unavailable, and (ii) femto and pico base stations and relay stations deployed to improve coverage in poor coverage scenarios where system parameter messages from macro base stations may not be reliably decoded.

Figure 8:
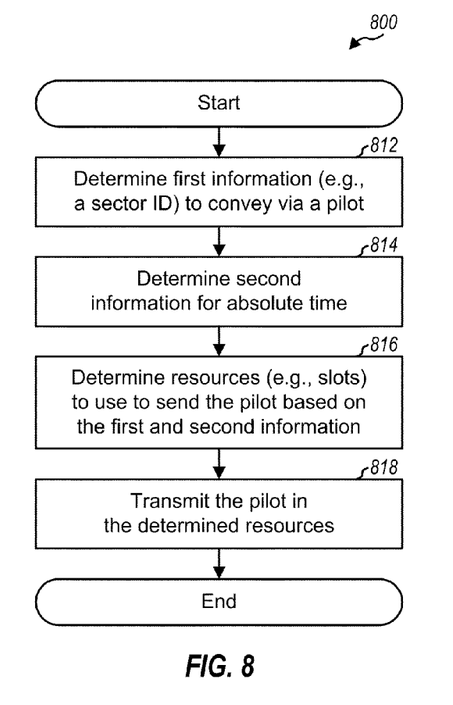
FIG. 8 shows a process for transmitting information.

FIG. 8 shows a design of a process 800 for transmitting information in a wireless communication network. Process 800 may be performed by a transmitter, which may be a base station for a sector or some other entity.

The transmitter may determine first information to convey via a pilot (block 812) and may also determine second information for absolute time (block 814). The pilot may comprise an HDP having greater coverage than a common pilot, which may also be transmitted by the transmitter. In one design, the first information may comprise a sector ID of a sector transmitting the pilot. In one design, the pilot may be transmitted in each pilot cycle, and the second information may comprise a pilot cycle index. The first and second information may also comprise other types of information. The transmitter may determine resources to use to send the pilot based on the first and second information (block 816). The resources may also be determined based further on a PN offset (PilotPN), a pilot scrambling code, a physical cell ID, or some other parameter assigned to the sector and/or other information. The transmitter may transmit the pilot in the determined resources (block 818).

In general, the resources may comprise time resources (e.g., slots), frequency resources (e.g., subcarriers), code resources, etc. In one design, the resources may comprise slots. The transmitter may select one slot out of multiple slots (e.g., 9 slots) available for sending the pilot in each pilot cycle based on a pseudo-random function of the sector ID, the pilot cycle index, and the PN offset, e.g., as shown in equation (1) or (2). The transmitter may then transmit the pilot in the determined slots.

In one design, the transmitter may partition the first information into multiple parts. The transmitter may then determine multiple sets of resources to use to send the pilot based on the multiple parts of the first information, one set of resources for each part of the first information. The transmitter may transmit the pilot in the multiple sets of resources. In one design, the transmitter may partition the sector ID into multiple parts including first and second parts. The first part may include M LSBs (e.g., 8 LSBs) of the sector ID, and the second part may include M more significant bits (e.g., 9th through 16th LSBs) of the sector ID, where M>1. The transmitter may determine a first set of slots to use to send the pilot in a first set of pilot cycles based on the first part of the sector ID and the pilot cycle index. The transmitter may determine a second set of slots to use to send the pilot in a second set of pilot cycles based on the second part of the sector ID and the pilot cycle index. The transmitter may transmit the pilot (i) in the first set of slots in the first set of pilot cycles and (ii) in the second set of slots in the second set of pilot cycles.

Figure 9:
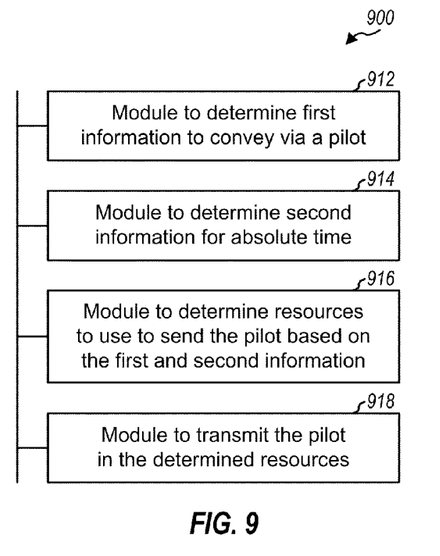
FIG. 9 shows an apparatus for transmitting information.

FIG. 9 shows a design of an apparatus 900 for transmitting information in a wireless communication network. Apparatus 900 includes a module 912 to determine first information to convey via a pilot, a module 914 to determine second information for absolute time, a module 916 to determine resources to use to send the pilot based on the first and second information, and a module 918 to transmit the pilot in the determined resources.

Figure 10:
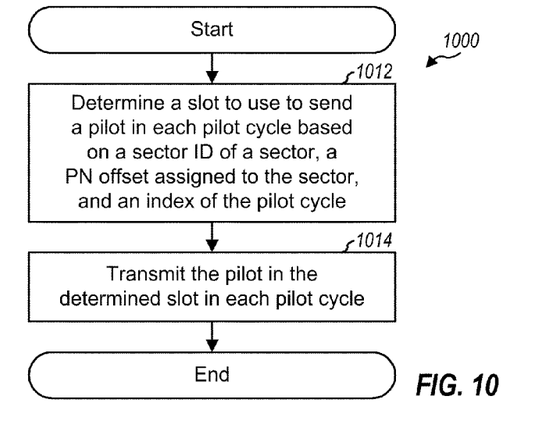
FIG. 10 shows a process for transmitting sector ID.

FIG. 10 shows a design of a process 1000 for transmitting sector ID. Process 1000 may be performed by a base station for a sector or some other entity. The base station may determine a slot to use to send a pilot in each pilot cycle based on a sector ID of the sector, a PN offset (PilotPN) assigned to the sector, and an index of the pilot cycle (block 1012). The base station may transmit the pilot in the determined slot in each pilot cycle (block 1014).

Figure 11:
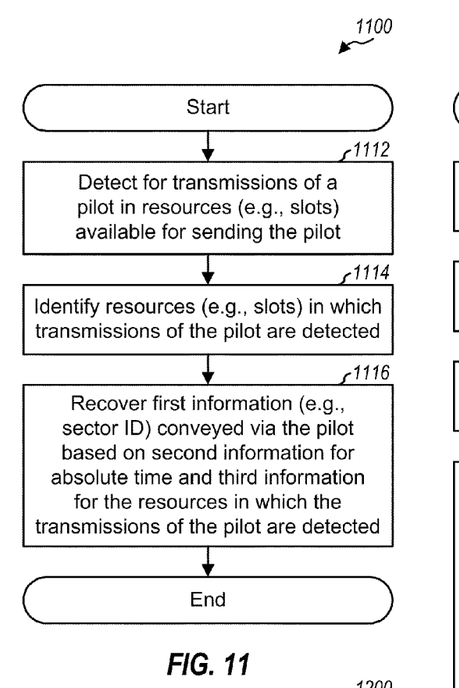
FIG. 11 shows a process for receiving information.

FIG. 11 shows a design of a process 1100 for receiving information in a wireless communication network. Process 1100 may be performed by a receiver, which may be a terminal or some other entity.

The receiver may detect for transmissions of a pilot in resources available for sending the pilot (block 1112). The pilot may comprise an HDP having wider coverage than a common pilot. The receiver may identify resources in which transmissions of the pilot are detected (block 1114). The receiver may recover first information conveyed via the pilot based on second information for absolute time and third information for the resources in which the transmissions of the pilot are detected (block 1116).

In one design, the first information may comprise a sector ID. In one design, a transmission of the pilot may be sent by a sector in each pilot cycle, and the second information may comprise a pilot cycle index. The receiver may obtain an estimate of absolute time based on signals from satellites, signals from base stations in the wireless network, NTP, and/or other means. In one design, the resources may comprise slots. The receiver may determine slots in which the transmissions of the pilot are detected and may recover the first information based on these slots.

In one design of block 1116, the receiver may determine a list of candidate sectors potentially transmitting the pilot (i.e., a list of SectorID candidates). The receiver may determine resources used to transmit the pilot by each candidate sector based on its sector ID. The receiver may remove candidate sectors using resources not matching the resources in which the transmissions of the pilot are detected. The receiver may provide a candidate sector using resources matching the resources in which the transmissions of the pilot are detected as a detected sector transmitting the pilot.

In one design, the receiver may determine the resources used by each candidate sector and may remove candidate sectors in each pilot cycle. In one design, the receiver may start with a particular pilot cycle and may continue forward in time for each subsequent pilot cycle until the detected sector is determined or the list of candidate sectors is empty, e.g., as shown in FIG. 6. In another design, the receiver may start with a particular pilot cycle and may continue backward in time for each prior pilot cycle until the detected sector is determined or the list of candidate sectors is empty, e.g., as shown in FIG. 7.

In one design, the receiver may determine a PN offset of each detected transmission of the pilot. The receiver may perform the processing described above (i.e., determine a list of candidate sectors, determine resources used by each candidate sector, remove candidate sectors, and provide a candidate sector) for each PN offset for which at least one transmission of the pilot is detected.

In one design, the receiver may identify a first set of resources (e.g., a first set of slots) in which transmissions of the pilot are detected (e.g., in a first set of pilot cycles). The receiver may identify a second set of resources (e.g., a second set of slots) in which transmissions of the pilot are also detected (e.g., in a second set of pilot cycles). The receiver may determine a first part of the first information (e.g., a first part of the sector ID) based on the first set of resources in which the transmissions of the pilot are detected. The receiver may also determine a second part of the first information (e.g., a second part of the sector ID) based on the second set of resources in which the transmissions of the pilot are detected.

In general, an information block may be transmitted via the pilot. A list of candidate information blocks potentially transmitted via the pilot may be determined. Resources used to transmit the pilot for each candidate information block may be determined. Candidate information blocks using resources not matching the resources in which the transmissions of the pilot are detected may be removed. A candidate information block using resources matching the resources in which the transmissions of the pilot are detected may be provided as a detected information block transmitted via the pilot.

Figure 12:
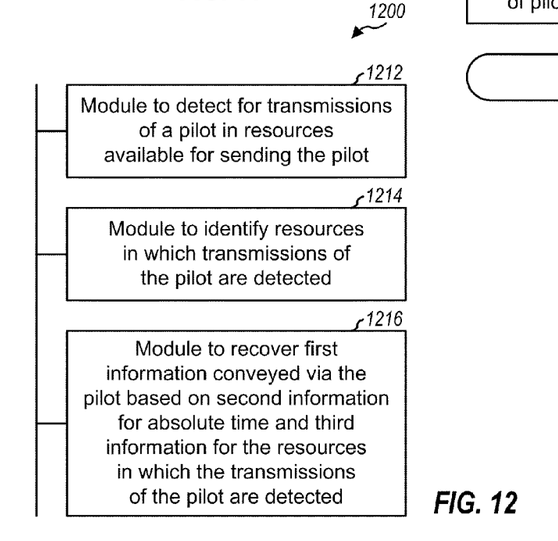
FIG. 12 shows an apparatus for receiving information.

FIG. 12 shows a design of an apparatus 1200 for receiving information in a wireless communication network. Apparatus 1200 includes a module 1212 to detect for transmissions of a pilot in resources available for sending the pilot, a module 1214 to identify resources in which transmissions of the pilot are detected, and a module 1216 to recover first information conveyed via the pilot based on second information for absolute time and third information for the resources in which the transmissions of the pilot are detected.

Figure 13:
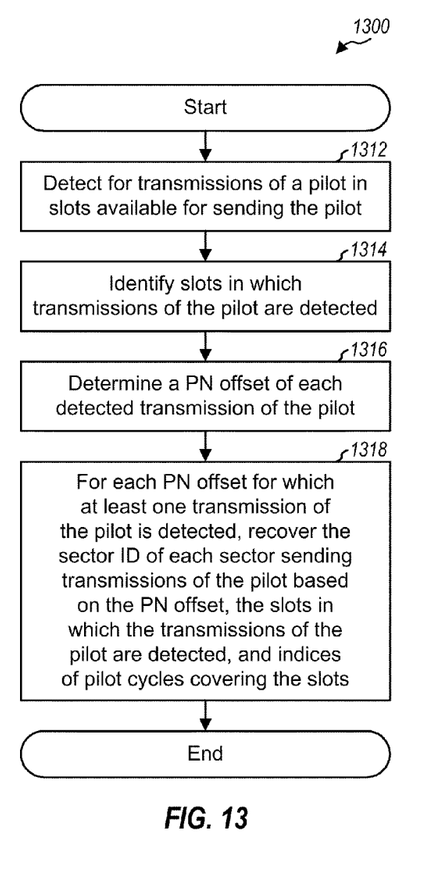
FIG. 13 shows a process for recovering sector ID.

FIG. 13 shows a design of a process 1300 for determining sector ID. Process 1300 may be performed by a terminal or some other entity. The terminal may detect for transmissions of a pilot (e.g., an HDP) in slots available for sending the pilot (block 1312). The terminal may identify slots in which transmissions of the pilot are detected (block 1314). The terminal may determine a PN offset of each detected transmission of the pilot (block 1316). For each PN offset for which at least one transmission of the pilot is detected, the terminal may recover the sector ID of each sector sending transmissions of the pilot with this PN offset based on (i) the PN offset, (ii) the slots in which the transmissions of the pilot are detected, and (iii) the indices of the pilot cycles covering these slots (block 1318).

The modules in FIGS. 9 and 12 may comprise processors, electronics devices, hardware devices, electronics components, logical circuits, memories, software codes, firmware codes, etc., or any combination thereof.

Figure 14:
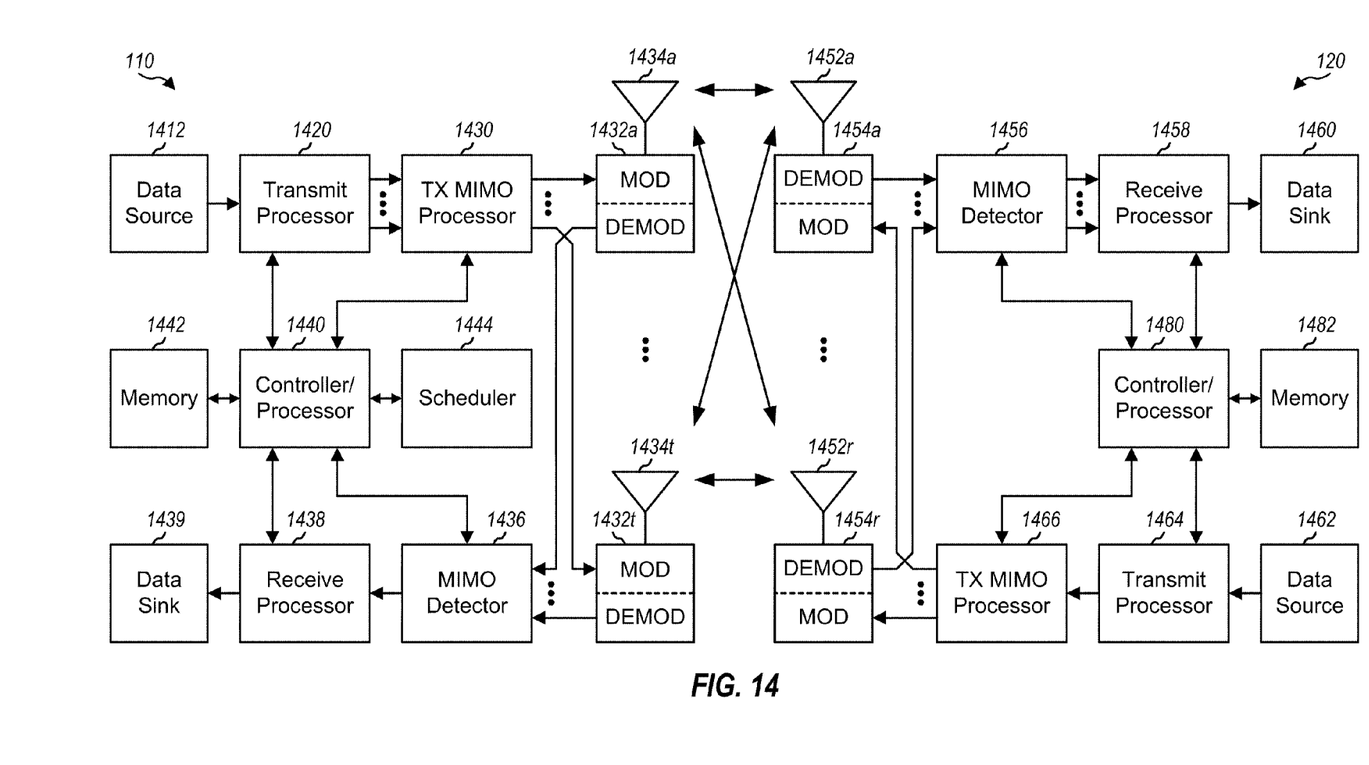
FIG. 14 shows a block diagram of a base station and a terminal.

FIG. 14 shows a block diagram of a design of a base station 110 and a terminal 120, which may be one of the base stations and one of the terminals in FIG. 1. Base station 110 may support one or more sectors. Base station 110 may be equipped with T antennas 1434a through 1434t, and terminal 120 may be equipped with R antennas 1452a through 1452r, where in general T≥1 and R≥1.

At base station 110, a transmit processor 1420 may receive data for one or more terminals from a data source 1412, process (e.g., encode, interleave, and symbol map) the data for each terminal, and provide data symbols for all terminals. Transmit processor 1420 may also process control information from a controller/processor 1440 and provide control symbols. Transmit processor 1420 may also generate pilot symbols for an HDP, a common pilot, and/or other pilots or reference signals for each sector and may implement transmitter 500 in FIG. 5. A transmit (TX) multiple-input multiple-output (MIMO) processor 1430 may perform precoding on the data symbols, the control symbols, and/or the pilot symbols, if applicable. Processor 1430 may provide T output symbol streams to T modulators (MODs) 1432a through 1432t. Each modulator 1432 may process a respective output symbol stream (e.g., for CDMA, OFDM, etc.) to obtain an output sample stream. Each modulator 1432 may further process (e.g., convert to analog, amplify, filter, and upconvert) the output sample stream to obtain a forward link signal. T forward link signals from modulators 1432a through 1432t may be transmitted via T antennas 1434a through 1434t, respectively.

At terminal 120, antennas 1452a through 1452r may receive the forward link signals from base station 110 and may provide received signals to demodulators (DEMODs) 1454a through 1454r, respectively. Each demodulator 1454 may condition (e.g., filter, amplify, downconvert, and digitize) a respective received signal to obtain input samples. Each demodulator 1454 may further process the input samples (e.g., for CDMA, OFDM, etc.) to obtain received symbols. A MIMO detector 1456 may obtain received symbols from all R demodulators 1454a through 1454r, perform receiver spatial processing on the received symbols if applicable, and provide detected symbols. A receive processor 1458 may process (e.g., demodulate, deinterleave, and decode) the detected symbols, provide decoded data for terminal 120 to a data sink 1460, and provide decoded control information to a controller/processor 1480. Processor 1458 may also detect for information (e.g., sector IDs) conveyed via pilots (e.g., HDPs).

On the reverse link, at terminal 120, a transmit processor 1464 may receive and process data from a data source 1462 and control information from controller/processor 1480. Transmit processor 1464 may also generate pilot symbols. The symbols from transmit processor 1464 may be precoded by a TX MIMO processor 1466 if applicable, further processed by modulators 1454a through 1454r, and transmitted to base station 110. At base station 110, the reverse link signals from terminal 120 may be received by antennas 1434, processed by demodulators 1432, detected by a MIMO detector 1436 if applicable, and further processed by a receive processor 1438 to obtain decoded data and control information transmitted by terminal 120.

Controllers/processors 1440 and 1480 may direct the operation at base station 110 and terminal 120, respectively. Processor 1420 and/or other processors and modules at base station 110 may perform or direct process 800 in FIG. 8, process 1000 in FIG. 10, and/or other processes for the techniques described herein. Processor 1458 and/or other processors and modules at terminal 120 may perform or direct process 1100 in FIG. 11, process 1300 in FIG. 13, and/or other processes for the techniques described herein. Memories 1442 and 1482 may store data and program codes for base station 110 and terminal 120, respectively. A scheduler 1444 may schedule terminals for data transmission on the forward and/or reverse link and may provide resource grants for the scheduled terminals.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of sending information in a wireless communication network, comprising:
    determining first information to convey via a pilot;
    determining second information for reference time;
    determining a sequence of slots to use to send the pilot as a function of the first and second information;
    partitioning the first information into multiple parts, wherein determining the sequence of slots comprises determining a set of slots for each of the multiple parts of the first information; and
    transmitting the pilot in the determined sequence of slots.

2. The method of claim 1, wherein the first information comprises a sector identity (ID) of a sector transmitting the pilot.

3. The method of claim 2, wherein the pilot is transmitted in each pilot cycle, and wherein the second information comprises a pilot cycle index.

4. The method of claim 3, wherein the determining the sequence of slots to use to send the pilot comprises selecting one slot out of multiple slots available for sending the pilot in each pilot cycle based on a pseudo-random function of the sector ID, the pilot cycle index, and a pseudo-random number (PN) offset assigned to the sector transmitting the pilot.

5. The method of claim 1, wherein the sequence of slots to use to send the pilot is determined based further on a pseudo-random number (PN) offset assigned to a sector transmitting the pilot.

6. The method of claim 1, wherein the first information comprises a sector identity (ID) of a sector transmitting the pilot, and wherein each part of the first information comprises a different portion of the sector ID.

7. The method of claim 1, wherein the pilot comprises a highly detectable pilot (HDP), the method further comprising:
    transmitting a common pilot having smaller coverage than the HDP.

8. A method of sending information in a wireless communication network, comprising:
  determining first information to convey via a pilot;
  determining second information for reference time;
  determining resources to use to send the pilot based on the first and second information;
  transmitting the pilot in the determined resources, wherein the first information comprises a sector identity (ID) of a sector transmitting the pilot, wherein the pilot is transmitted in each pilot cycle, wherein the second information comprises a pilot cycle index; and
  partitioning the sector ID into multiple parts comprising a first part and a second part, the first part comprising M least significant bits (LSBs) of the sector ID, and the second part comprising M more significant bits of the sector ID, where M is an integer greater than one, wherein the determining the resources to use to send the pilot comprises determining a first set of slots to use to send the pilot in a first set of pilot cycles based on the first part of the sector ID and the pilot cycle index, and determining a second set of slots to use to send the pilot in a second set of pilot cycles based on the second part of the sector ID and the pilot cycle index, and wherein the transmitting the pilot comprises transmitting the pilot in the first set of slots in the first set of pilot cycles, and transmitting the pilot in the second set of slots in the second set of pilot cycles.

9. An apparatus for wireless communication, comprising:
  means for determining first information to convey via a pilot;
  means for determining second information for reference time;
  means for determining a sequence of slots to use to send the pilot as a function of the first and second information;
  means for partitioning the first information into multiple parts, wherein determining the sequence of slots comprises determining a set of slots for each of the multiple parts of the first information; and
  means for transmitting the pilot in the determined sequence of slots.

10. The apparatus of claim 9, wherein the first information comprises a sector identity (ID) of a sector transmitting the pilot, wherein the pilot is transmitted in each pilot cycle, and wherein the second information comprises a pilot cycle index.

11. The apparatus of claim 9, wherein the means for determining the sequence of slots to use to send the pilot comprises means for selecting one slot out of multiple slots available for sending the pilot in each pilot cycle based on a pseudo-random function of the sector ID, the pilot cycle index, and a pseudo-random number (PN) offset assigned to the sector transmitting the pilot.

12. An apparatus for wireless communication, comprising at least one processor configured to:
  determine first information to convey via a pilot;
  determine second information for reference time;
  determine a sequence of slots to use to send the pilot as a function of the first and second information;
  partition the first information into multiple parts, wherein determining the sequence of slots comprises determining a set of slots for each of the multiple parts of the first information; and
  transmit the pilot in the determined sequence of slots.

13. The apparatus of claim 12, wherein the first information comprises a sector identity (ID) of a sector transmitting the pilot, wherein the pilot is transmitted in each pilot cycle, and wherein the second information comprises a pilot cycle index.

14. The apparatus of claim 13, wherein the at least one processor is configured to select one slot out of multiple slots available for sending the pilot in each pilot cycle based on a pseudo-random function of the sector ID, the pilot cycle index, and a pseudo-random number (PN) offset assigned to the sector transmitting the pilot.

15. A non-transitory computer-readable medium storing executable instructions which cause a data processing device to:
  determine first information to convey via a pilot,
  determine second information for reference time,
  determine a sequence of slots to use to send the pilot as a function of the first and second information,
  partition the first information into multiple parts, wherein determining the sequence of slots comprises determining a set of slots for each of the multiple parts of the first information, and
  transmit the pilot in the determined sequence of slots.

16. The non-transitory computer-readable medium of claim 15, wherein the first information comprises a sector identity (ID) of a sector transmitting the pilot, wherein the pilot is transmitted in each pilot cycle, and wherein the second information comprises a pilot cycle index.

17. The non-transitory computer-readable medium of claim 16, wherein the instructions further cause the data processing device to select one slot out of multiple slots available for sending the pilot in each pilot cycle based on a pseudo-random function of the sector ID, the pilot cycle index, and a pseudo-random number (PN) offset assigned to the sector transmitting the pilot.

18. A method of sending information in a wireless communication network, comprising:
  determining a sequence of slots to use to send a pilot in each pilot cycle as a function of a sector identity (ID) of a sector, a pseudo-random number (PN) offset assigned to the sector, and an index of the pilot cycle;
  partitioning the sector ID into multiple parts, wherein determining the sequence of slots comprises determining a set of slots for each of the multiple parts of the sector ID; and
  transmitting the pilot in the determined sequence of slots in each pilot cycle.

19. An apparatus for sending information in a wireless communication network, comprising:
  means for determining a sequence of slots to use to send a pilot in each pilot cycle as a function of a sector identity (ID) of a sector, a pseudo-random number (PN) offset assigned to the sector, and an index of the pilot cycle;
  means for partitioning the sector ID into multiple parts, wherein determining the sequence of slots comprises determining a set of slots for each of the multiple parts of the sector ID; and
  means for transmitting the pilot in the determined sequence of slots.

20. An apparatus for sending information in a wireless communication network, comprising at least one processor configured to:
  determine a sequence of slots to use to send a pilot in each pilot cycle as a function of a sector identity (ID) of a sector, a pseudo-random number (PN) offset assigned to the sector, and an index of the pilot cycle;

partition the sector ID into multiple parts, wherein determining the sequence of slots comprises determining a set of slots for each of the multiple parts of the sector ID; and transmit the pilot in the determined sequence of slots.

21. A non-transitory computer-readable medium storing executable instructions which cause a data processing device to:

determine a sequence of slots to use to send a pilot in each pilot cycle as a function of a sector identity (ID) of a sector, a pseudo-random number (PN) offset assigned to the sector, and an index of the pilot cycle;

partition the sector ID into multiple parts, wherein determining the sequence of slots comprises determining a set of slots for each of the multiple parts of the sector ID; and transmit the pilot in the determined sequence of slots.

* * * * *